Patented Dec. 27, 1949

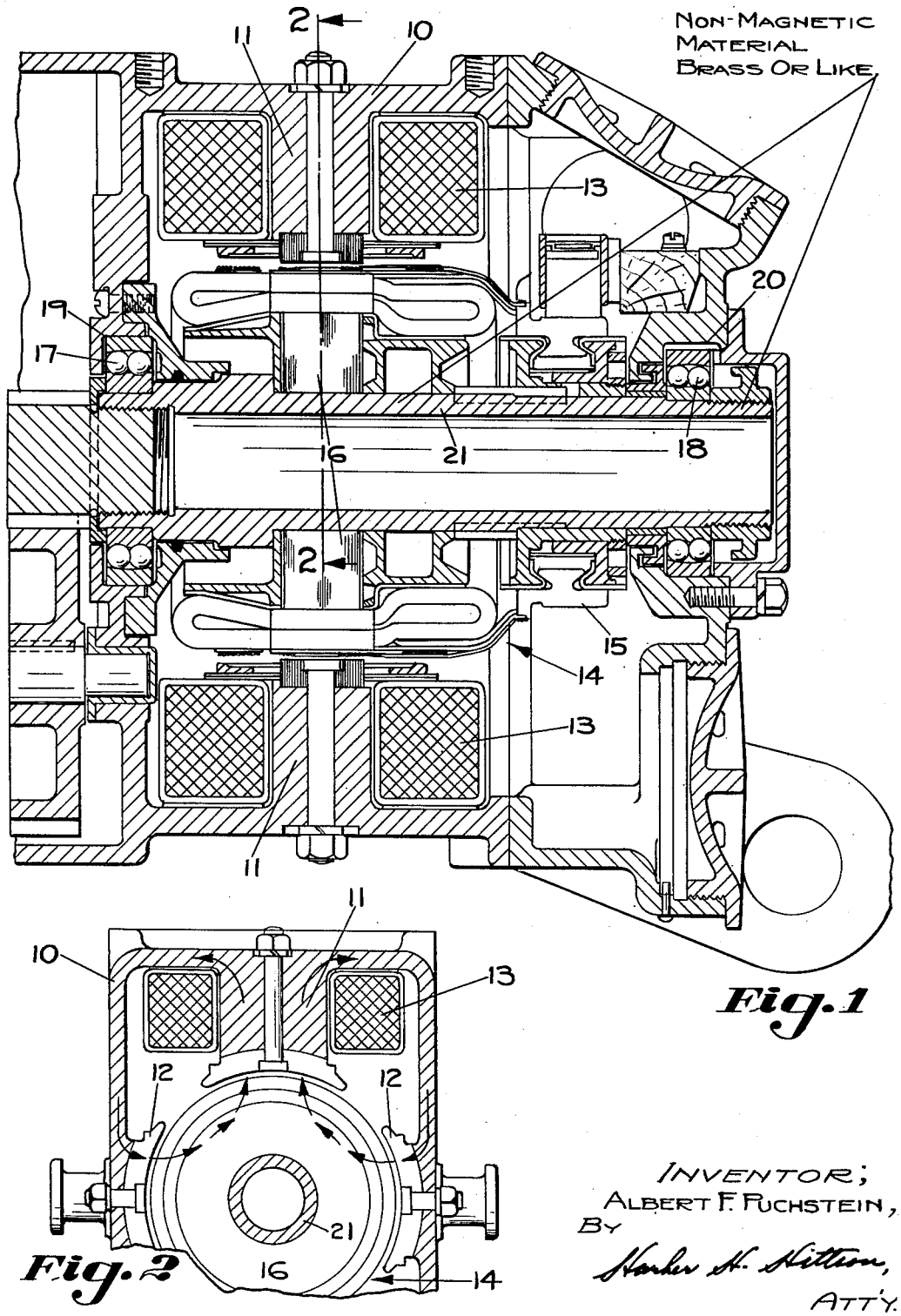

2,492,317

UNITED STATES PATENT OFFICE 2,492,317

NONMAGNETIC SLEEVED ELECTRIC MOTOR

Albert F. Puchstein, Columbus, Ohio, assignor to The Jeffrey Manufacturing Company, a corporation of Ohio Application September 9, 1947, Serial No. 772,957

2 Claims. (Cl. 172—36)

This invention relates to an electric motor, and an object of the invention is to provide an electric motor which includes a rotor mounted for rotation on spaced anti-friction bearings, parts of which are of magnetic material, and in which the rotor shaft is constructed of non-magnetic material so as to insure proper operation of the anti-friction bearings.

Other objects of the invention will appear hereinafter, the novel features and combinations being set forth in the appended claims.

In the accompanying drawings,

Fig. 1 is a sectional view through a motor incorporating the features of my invention; and Fig. 2 is a sectional view taken on the line 2—2 of Fig. 1, looking in the direction of the arrows.

The electric motor of my invention includes the usual frame or housing 10 of magnetic material, such as iron or steel, which is provided with the usual field structure including main or salient poles 11 and consequent poles 12. Field coils 13 are provided for the main or salient poles 11. The motor illustrated is of the direct current type and includes armature 14 provided with a commutator 15 of standard construction, the armature including laminations 16 of magnetic material, through which the principal flux is intended to flow, the preferred path of the flux being indicated by the arrows in Fig. 2 of the drawings. As in standard practice the main frame 10 of magnetic material provides a path for the flux as it flows through the air gap between the armature or rotor 14 and the field structure including the poles 11, windings 13, etc.

The rotor 14 is mounted for rotation on a pair of spaced anti-friction bearings 17 and 18 which are housed in cups 19 and 20, respectively, formed on opposite side plates of the main frame or housing 10, these side plates being of magnetic material and that on the left, as illustrated in Fig. 1 of the drawings, being an integral part of the main frame 10.

As in standard practice the anti-friction bearings 17 and 18 have their parts of magnetic material, such as steel; that is, the inner and outer races and the balls or rollers are of magnetic material, generally steel. As a consequence of this fact, unless there is a magnetic isolation of the bearings 17 and 18, there will be sufficient flux leakage through said bearings to cause excessive heating, leading to early destruction.

To insure the proper operation of said anti-friction bearings 17 and 18, the rotor 14 is mounted on a shaft 21 which is in the form of a hollow sleeve, though if desired it might be built up of a core of either magnetic or non-magnetic material, with a superposed non-magnetic sleeve, or it might be solid and of non-magnetic material. In any event, the sleeve 21 is of non-magnetic material, such as brass or the like. Furthermore, in the preferred form this sleeve extends continuously between the two bearings 17 and 18. In other words, it is a one-piece member. In the alternate, but not preferred, arrangement, two or more non-magnetic sleeves might be employed mounted on a shaft, there being a sleeve or ring adjacent each bearing 17 and 18, with a shaft interposed. It is preferred, however, to use the one-piece sleeve 21 and make it hollow, though a solid shaft is also contemplated.

It is evident that the rotor 14 is rigidly attached to the sleeve type shaft 21, and the opposite ends thereof are supported from the main frame 10 in the anti-friction bearings 17 and 18. Because of the non-magnetic character of the sleeve 21 there will be very little flux leakage through said bearings 17 and 18, as a consequence of which they will be substantially free of heating caused by magnetic leakage fluxes.

Another effect of this sleeve 21 of non-magnetic material is to increase the reluctance of the leakage paths around the ends of the motor and thus to increase the flux in the intended path, as indicated by the arrows in Fig. 2 of the drawings, thus increasing the output of the motor.

The non-magnetic sleeve is also useful for improving commutation when parallel or lap windings are used. This is so because the non-magnetic sleeve acts to equalize the useful fluxes from main and consequent poles and in this way causes each armature path to carry more nearly its share of the load.

While the invention is illustrated in connection with a consequent pole motor to which it is particularly adapted because of the tendency of flux leakage along the shaft, in its broader aspects it is applicable to other types of electric motors in which similar effects are or may be present. It is likewise applicable to alternating as well as direct current electric motors.

Obviously those skilled in the art may make various changes in the details and arrangement of parts, without departing from the spirit and scope of the invention as defined by the claims hereto appended, and I therefore wish not to be restricted to the precise construction herein disclosed.

Having thus described and shown an embodi- ment of my invention, what I desire to secure by Letters Patent of the United States is:

1. An electric motor including a main frame of magnetic material constituting the magnetic field iron of said motor, consequent and salient poles on said frame, windings for said salient poles adapted to produce flux flowing therethrough and through said consequent poles, a rotor having magnetic material, said frame, poles and rotor providing a magnetic path, anti-friction bearing means at opposite ends of said rotor mounting said rotor for rotation, said bearing means including rolling elements and races of magnetic material, and shaft means mounting said rotor between said bearing means, said shaft means including a sleeve of non-magnetic material extending continuously between and into said bearing means at opposite ends of said rotor.

2. An electric motor including a frame of magnetic material constituting the magnetic field iron of said motor and having salient and consequent poles, a field coil for each salient pole adapted to produce a flux flow through it and said consequent poles, a rotor in said frame made at least in part of magnetic material, rotor bearing receiving cups in opposite sides of said frame, anti-friction bearings in said cups having parts of magnetic material, and a non-magnetic shaft for said rotor extending between and into said anti-friction bearings.

ALBERT F. PUCHSTEIN.

REFERENCES CITED

The following references are of record in the file of this patent:

UNITED STATES PATENTS

| Number | Name | Date |
|---|---|---|
| 2,192,985 | Reis | Mar. 12, 1940 |
| 2,244,406 | Schonwald | June 3, 1941 |
| 2,421,592 | Bergman | June 3, 1947 |